United States Patent [19]

Hodge

[11] Patent Number: 4,766,775
[45] Date of Patent: Aug. 30, 1988

[54] MODULAR ROBOT MANIPULATOR

[76] Inventor: Steven W. Hodge, 3725 Robinson Pike Rd., Grandview, Mo. 64030

[21] Appl. No.: 858,683

[22] Filed: May 2, 1986

[51] Int. Cl.$^4$ .......................... B25J 17/00; B25J 18/00; F16L 23/02

[52] U.S. Cl. .......................................... 74/479; 403/13; 403/338; 901/15; 901/23; 901/28

[58] Field of Search ..................... 74/479; 403/338, 13; 901/15, 23, 24, 28

[56] References Cited

U.S. PATENT DOCUMENTS

| | | | |
|---|---|---|---|
| 2,706,648 | 4/1955 | Gosse | 403/338 X |
| 2,978,265 | 4/1961 | Cluff et al. | 403/338 |
| 3,155,240 | 11/1964 | Eude et al. | 214/1 |
| 4,089,427 | 5/1978 | Pardo et al. | 214/1 CM |
| 4,096,766 | 6/1978 | Pardo et al. | 74/640 |
| 4,183,189 | 1/1980 | Keller et al. | 403/338 X |
| 4,283,764 | 8/1981 | Crum et al. | 364/513 |
| 4,308,584 | 12/1981 | Arai | 901/15 X |
| 4,352,620 | 10/1982 | Inaba et al. | 414/225 |
| 4,353,677 | 10/1982 | Susnjara et al. | 414/735 |
| 4,370,091 | 1/1983 | Gagliardi | 414/738 X |
| 4,392,776 | 7/1983 | Shum | 414/744 R |
| 4,425,818 | 1/1984 | Asada et al. | 74/469 |
| 4,435,120 | 3/1984 | Ikeda et al. | 414/735 |
| 4,552,504 | 11/1985 | Nakada et al. | 901/15 X |

FOREIGN PATENT DOCUMENTS

| | | | |
|---|---|---|---|
| 203493 | 4/1966 | Sweden | 901/15 |
| 2126559 | 3/1984 | United Kingdom | 901/15 |

*Primary Examiner*—Allan D. Herrmann
*Attorney, Agent, or Firm*—Kokjer, Kircher, Bradley, Wharton, Bowman & Johnson

[57] ABSTRACT

A modular robotic remote manipulator is disclosed. The manipulator utilizes a base module, any number of generally identical but appropriately sized articulating modules, extender modules as may be needed, and an end effector module to accommodate the task assigned to the manipulator. The articulating modules are constructed to afford three different motions about three different axes which intersect at a common point lying between the input end and the output end of the module to effect a range of possible motion for the module output which defines an imaginary sphere. This module is also constructed to provide a separate rotary torque through the output coupling to the next module. The couplers for interconnecting the modules utilize toggle operated spool shaped locks. An end effector or gripper employs a rotating shaft and follower connected through a cable and pulley arrangement to operate the gripper jaws.

7 Claims, 4 Drawing Sheets

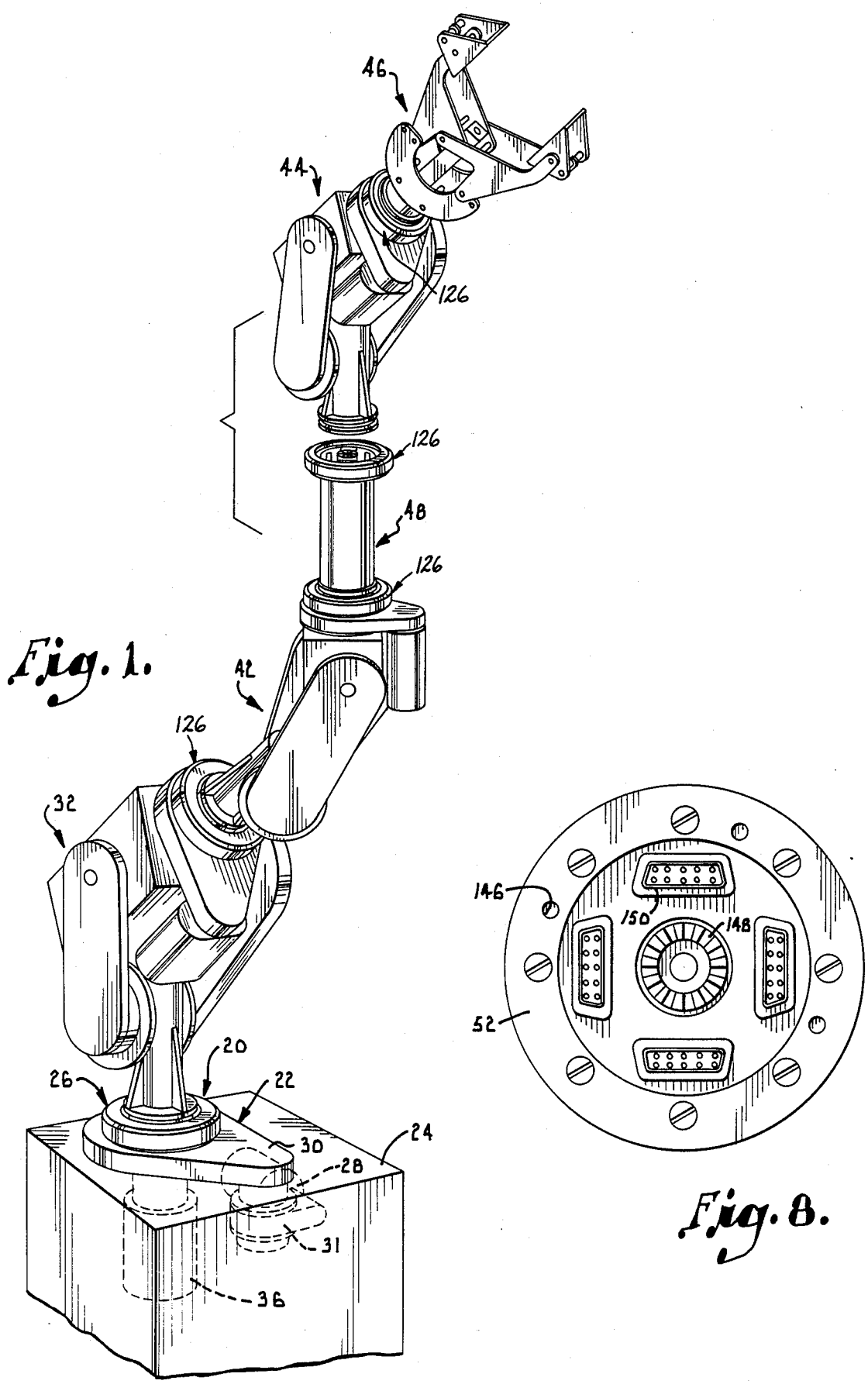

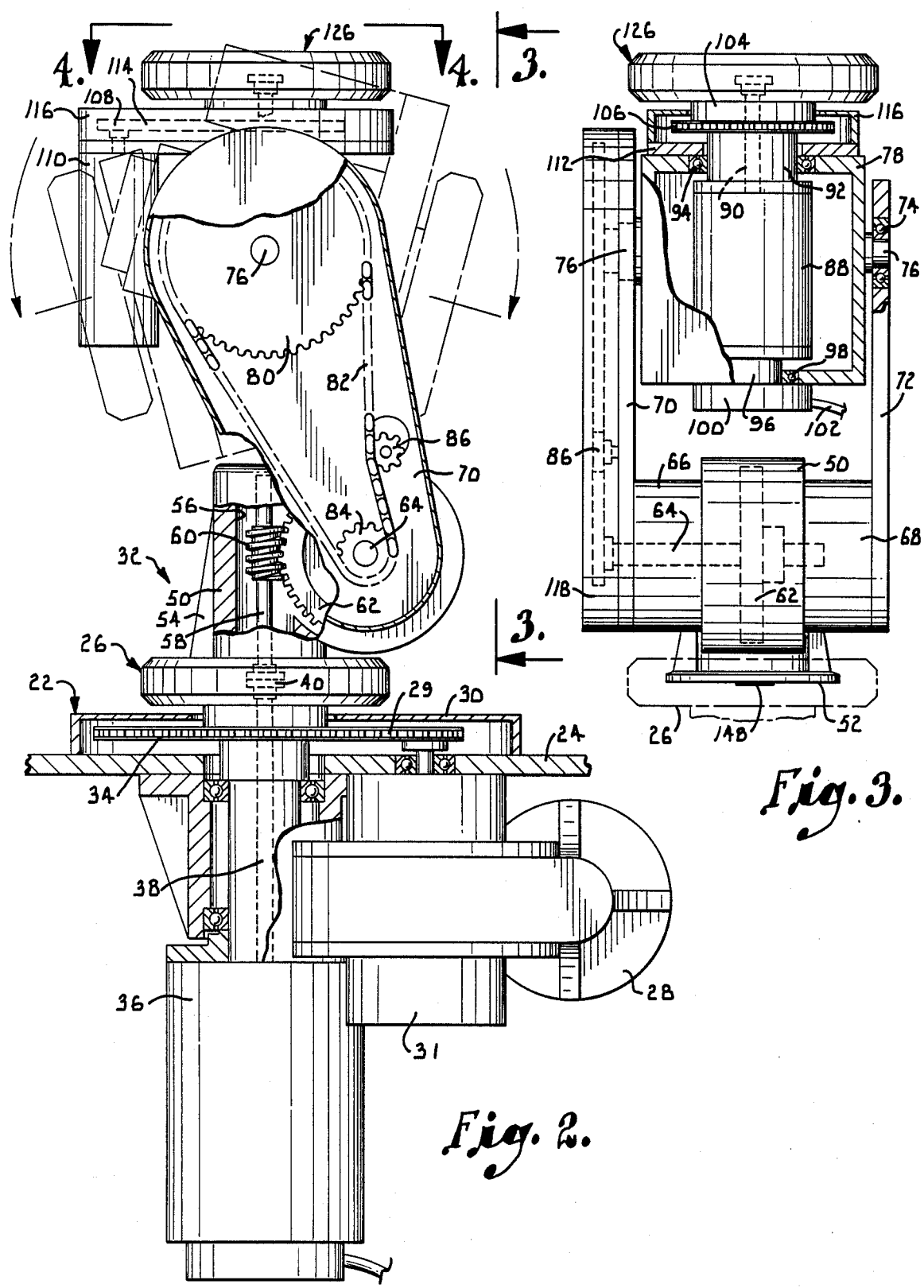

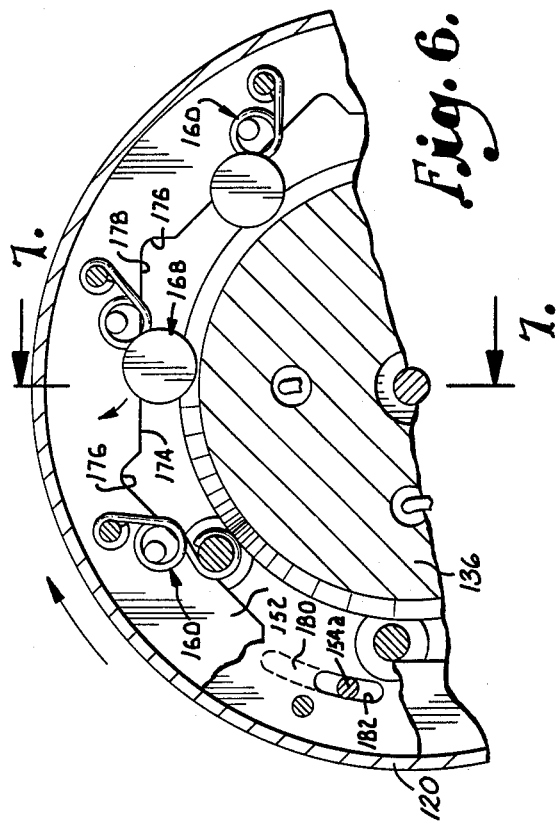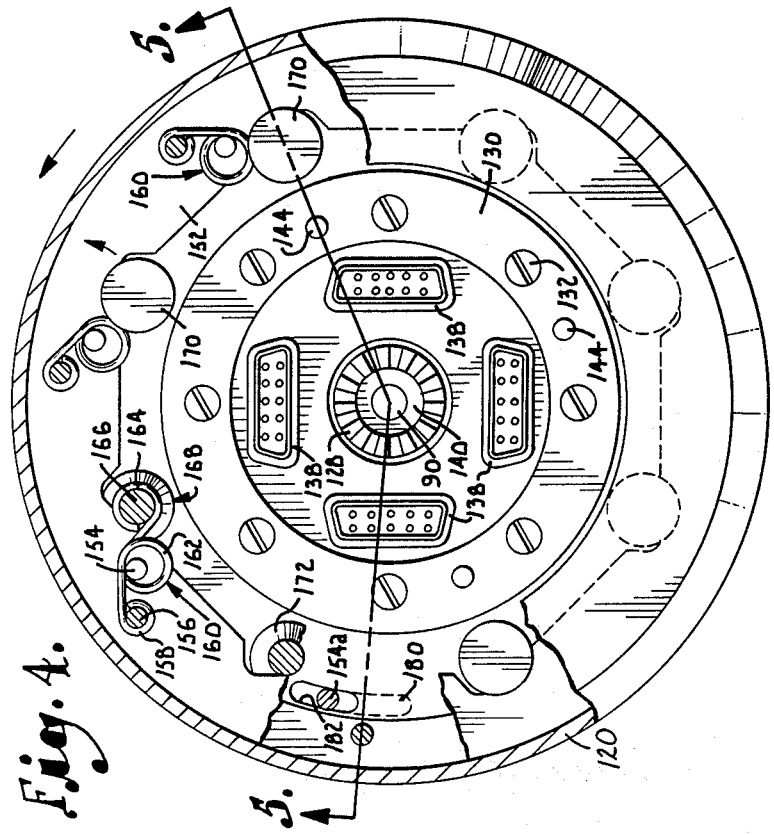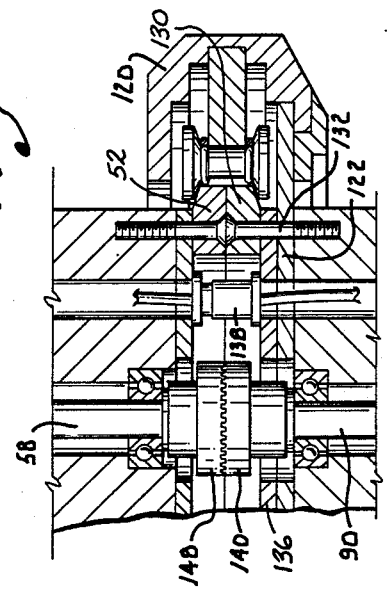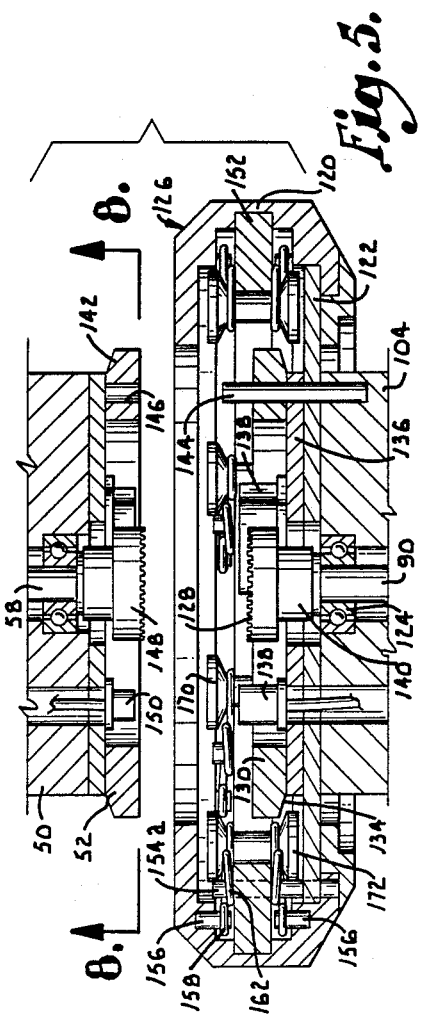

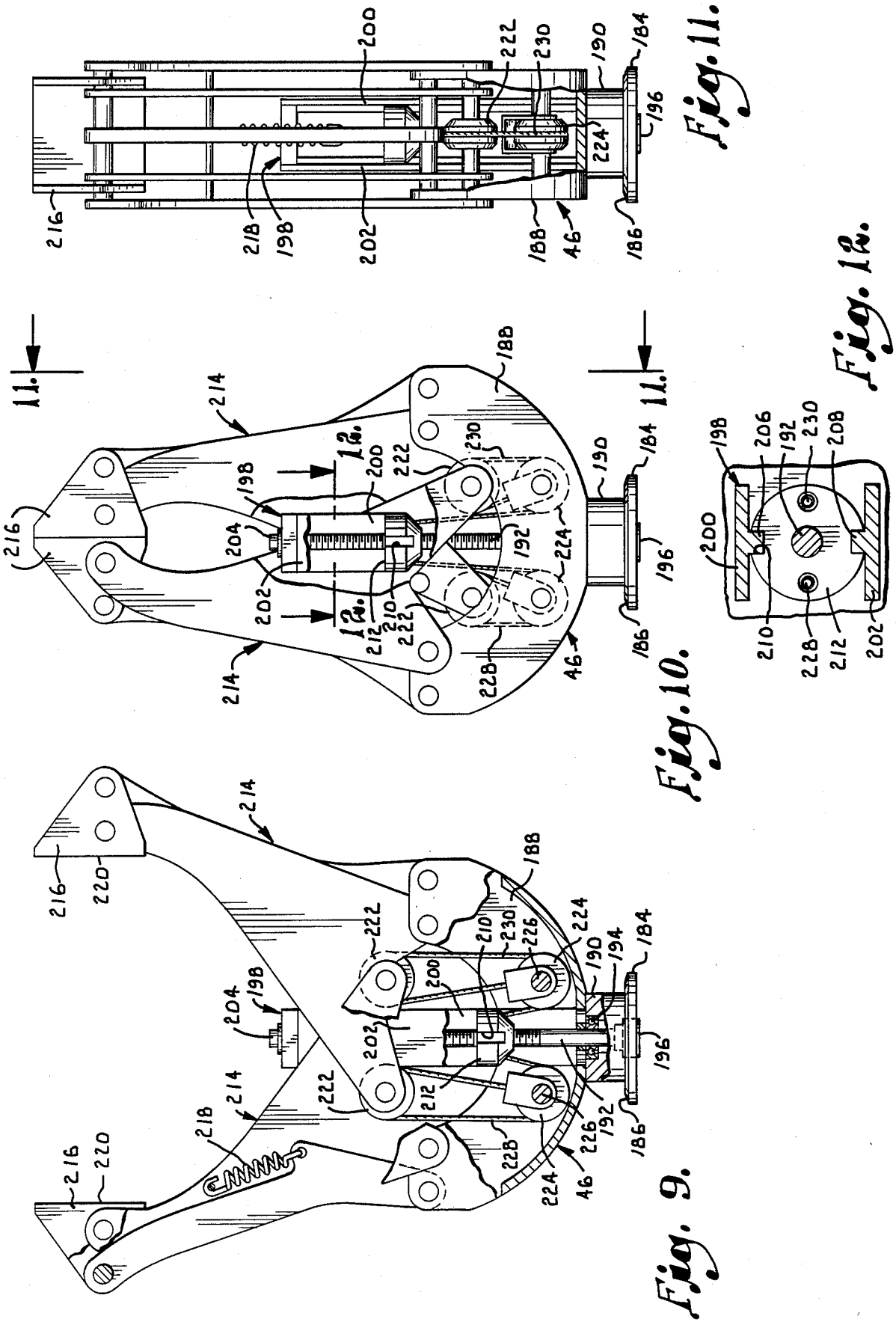

MODULAR ROBOT MANIPULATOR

This invention relates to modular robotics, and more particularly to a manipulator which may be incorporated into a robotic system usable for remote manipulation.

Manipulators which are capable of applying a variety of motions toward the accomplishment of various tasks are well known. Some systems of this type are designed and fabricated for a single specific purpose. Such machines may be designed and constructed specifically in accordance with the requirements of the task involved. More often, however, it is preferable that robotic systems be capable of accomplishing any of a variety of tasks which might be assigned. In order to enhance versatility, some such systems are constructed in modular form. Any number of various modules can be assembled together as may be needed to arrive at a system arrangement desirable for accomplishing the task required at the time. Subsequently, the system can be reconstructed with a different arrangement of modules for a different task.

The modules of systems of this type are interconnected in sequential fashion until the correct combination is achieved to obtain the types and ranges of movement necessary for the task. If a wide range of movement is required, sufficient modules are added until the construction is sufficient for accomplishing the movement. Similarly, when only a limited range of movement is required, modules may be removed to tailor the construction to the limits required.

The previous module constructions of which I am aware have not been capable of the ranges of motion which are desirable for optimum versatility in carrying out a wide variety of tasks which might be assigned to the robot. The limitations on available movement have resulted from the manner in which the modules have been constructed. Also, a quick and reliable system is needed for interconnecting the modules. An end effector capable of utilizing the axial transmission of torque from one module to another for enhanced adjustability of the gripping force of the effector is also desirable.

It is, therefore, a primary object of this invention to provide a module capable of incorporation into a remote manipulator system and which is constructed to provide for an improved range of motion at the output of the module.

In the accomplishment of the foregoing object, it is another important object of this invention to provide a module constructed so that the axes of the movements of the module intersect at a point between the input end and the output end of the module itself, thereby providing motion in all directions.

It is another important object of this invention to provide a module having a novel rotary drive extending through the output coupling of the module for transmitting operating torque from the module to the next successive module thereby eliminating the necessity for the next module to contain motors for all of its movements, effectively reducing the weight of the remote module.

It is a further important object of this invention to provide a novel coupling system for interconnecting the modules in a quick and efficient manner to facilitate easy tailoring of the manipulator assembly to that required to perform a particular assigned task.

A yet further object of the present invention is to present an effector module which is constructed in a manner for efficient operation by the novel modules of this invention.

These and other important aims and objectives of the present invention will be further explained or will become apparent from the following description of the figures of the drawing and from the explanation and appended claims.

In the drawings:

FIG. 1 is a partially exploded perspective view illustrating a typical remote manipulator assembly constructed from modules embodying the principles of this invention;

FIG. 2 is a side elevational view of a module embodying the principles of this invention shown attached to a base module for the remote manipulator system, parts being broken away and shown in cross section to reveal details of construction, certain parts appearing in phantom and alternate positions of module components appearing in dash dot lines;

FIG. 3 is a side elevational view taken along line 3—3 of FIG. 2, parts being broken away and shown in cross section and other parts appearing in phantom to reveal details of construction;

FIG. 4 is an enlarged top plan view of the connector of the module of FIG. 2 taken along 4—4 of FIG. 2, parts being broken away and shown in cross section to reveal details of construction;

FIG. 5 a detailed cross sectional view taken along line 5—5 of FIG. 4, the mating portion of an adjacent module being shown fragmentally in exploded position to illustrate the interrelationship of parts;

FIG. 6 is a fragmentary view similar to FIG. 4 but illustrating the coupler parts when the coupler is in its locked position;

FIG. 7 is a fragmentary, detailed cross-sectional view taken along line 7—7 of FIG. 6 and illustrating the coupler in its locked position engaging a pair of adjacent modules;

FIG. 8 is a bottom plan view of the coupling element forming a part of a mating module taken along line 8—8 of FIG. 5;

FIG. 9 is a side elevational view of an end effector for a remote manipulator of this invention, parts being broken away to reveal details of construction;

FIG. 10 is a view similar to FIG. 9 but illustrating the end effector in its closed condition;

FIG. 11 is a side elevational view taken along line 11—11 of FIG. 10, parts being broken away to reveal details of construction; and FIG. 12 a fragmentary cross-sectional view taken along line 12—12 of FIG. 10.

A modular robotic manipulator system assembled in one of its possible configurations from modules constructed pursuant to the principles of this invention is broadly designated in FIG. 1 of the drawing by the reference numeral 20. System 20 includes a base module 22 mounted in a stable, relatively fixed support 24 and having an output connector 26 which is rotatable by a motor 28 through a chain drive 29 contained in a housing 30. Motor 28 is coupled to drive 29 through a gear mechanism 31 as illustrated in FIG. 2 of the drawing.

Base module 22 is coupled through connector 26 with an articulating module 32 constructed in accordance with the principles of this invention. Coupler 26 may be similar in construction to all of the couplers utilized throughout the system to interconnect the respective individual modules to their adjacent modules and will be described in greater detail hereinafter. It suffices at this point to say that coupler 26 is mounted for rotation on the base support 24 and is rigidly connected with a sprocket 34 engaged by chain drive 29 for rotation of the coupler about a vertical axis as seen in FIG. 2. A motor 36 is rotatably mounted on support 24 for rotation with coupler 26 and includes an output shaft 38 coaxial with the axis of rotation of coupler 26. Shaft 38 terminates in a connector 40 projecting into the center of coupler 26 for imparting torque from motor 36 to module 32 as will be subsequently explained.

Referring again to FIG. 1 of the drawing, the robotic manipulator system may be constructed from as many interconnected modules as may be required to accomplish an assigned task. In the example illustrated, module 32 immediately adjacent the base module 22 is of a type affording the full range of motions available from the module construction embodying the principles of this invention. The next adjacent module 42 is also of this type and may be constructed substantially identical to module 32 if desired. However, in the embodiment chosen for illustration, module 42 is like module 32 with the exception that the major components are scaled down to reduce the weight as permitted in view of the diminished strength requirements for a module located further from the base module. Another module 44 spaced even further from the base module than is module 42 could conceivably be of even smaller construction. Module 44 is otherwise identical to modules 32 and 42.

It is a feature of this invention that the like modules intended for incorporation into the robotic manipulator system will all have a common coupler arrangement so that modules of differing sizes can be incorporated into the system at any position as required for accomplishing any particular task. Usually, the further the location of a module from the base module, the less the strength requirements for that module. This can be translated into particular weight savings by utilizing modules of smaller construction. Obviously, the more the weight is reduced along the remote locations of the manipulator arm, the less the strength requirements at the base of the system.

The final output for a robotic manipulator system is governed by the use intended. Accordingly, the construction of the final module will be determined by the parameters of the assigned task. In the embodiment chosen for illustration, it is assumed that the task for the manipulator may be a gripping action. Accordingly, the output module 46 of the illustrated manipulator is constructed with articulating jaws to accomplish the gripping task. Output modules of different construction could, of course, be utilized.

The range of motion or positional requirements for the task of the manipulator may dictate that a greater spacing be established between certain modules in the system than would be provided by the construction of the articulating modules themselves. Accordingly, extender modules may be variously incorporated into the system between the articulating modules. In the embodiment illustrated in FIG. 1, an extender module 48 is interposed between modules 42 and 44. Extender modules for this purpose are well known in the art and need not be described in great detail. It suffices to say that the module 48 incorporates the same coupling system as will be described in greater detail with respect to the other modules. Extender module 48 is capable of translating the rotational torque from the output coupler of an articulating module to the input coupler components of the next adjacent module. Further, the coaxial drive at the output coupler of a previous module is transmitted through the extender module to the next module for operating the latter as will be understood more fully hereinafter. Manifestly, any number of extender modules may be incorporated at any positions within the manipulator assembly as may be required. Further, the lengths and strength constructions of the respective extender modules can be varied as needed.

Returning more particularly to the construction of a typical articulating module 32 (FIGS. 2 and 3) a housing 50 has secured to its lowermost end an annular ring structure 52 (FIG. 5) which extends outwardly in the nature of a flange from the outer side wall of housing 50. One or more gussets 54 integral with housing 50 may be provided for strengthening the side wall of the housing. Ring 52 is adapted to be inserted into and locked with coupler 26 as will be described later. It suffices at this point to say that coupler 26 locks housing 50 to the coupler for rotating the housing about the axis of rotation of coupler 26. Since housing 50 is the base supporting member for module 32, the entire module rotates with coupling 26 about this axis.

An axially extending bore 56 in housing 50 has mounted therein in suitable bearings (not shown) a rotatable shaft 58 interconnected at its lowermost end with a connector 40 driven by motor 36. A worm 60 mounted for rotation on shaft 58 is engaged in driving relationship with a gear 62 mounted in housing 50 on a transverse shaft 64 rotatably mounted on bearings (not shown) contained within laterally projecting flanges 66 and 68 integral with housing 50. A pair of arms 70 and 72 of generally plate construction are mounted to the housing flanges 66 and 68 respectively as illustrated best in FIG. 3 of the drawing. These arms project upwardly in spaced apart, parallel relationship and each mounts a bearing 74 to which is pivotally mounted on stub shaft 76 a housing 78.

Means for pivoting housing 78 on the axis defined by the aligned stub shafts 76 comprises a relatively large gear 80 secured to the proximal shaft 76 outboard of arm 70. A drive chain 82 connects gear 80 with a smaller gear 84 mounted on shaft 64 and driven by the latter. An idler gear 86 mounted on arm 70 serves as a chain tightener as will be readily understood.

A motor 88 having an output shaft 90 is housed in the open interior of housing 78 and is rotatably mounted in the housing by means of an upwardly extending mounting flange 92 rotatably carried in a bearing 94 received in the upper end of housing 78. Similarly, a depending flange 96 secured to motor 88 is rotatably received in a bearing 98 in the bottom wall of flange 78 and in axial alignment with bearing 94. A rotation sensor 100 forming a part of means to control motor 88 is secured to flange 96 and is coupled with a source of electrical energy by an electrical cable 102.

The upper end of flange 92 has an integral, outwardly extending rim or flange 104 and has rigidly secured thereto a gear 106 connected to the output sprocket 108 of a motor 110 mounted on a plate 112 secured to, and projecting laterally from the upper side wall of housing 78 as shown in FIGS. 2 and 3 of the drawing. A chain 114 operably connects the output sprocket 108 of motor 110 with gear 106 for rotating flange 92 and motor 88 about the axis of the shaft of the latter as will be understood. A protective cover 116 encloses drive chain 114 and its associated gears. Similarly, a protective cover 118 encloses chain 82 and the gears interconnected thereby.

A coupler designated by the reference numeral 126 similar in construction to coupler 26 is rigidly mounted to the upper end of flange 104 for rotation with the latter by motor 110. The details of construction of the couplers can best be understood by reference to FIGS. 4–7 of the drawings. Each coupler includes an annular rim or housing 120 of generally U-shaped cross-sectional configuration. A disc 122 is secured to flange 104 and extends into the lowermost edge of housing 122 to rotatably secure the latter to the flange. Disc 122 has a central opening through which projects the shaft 90 of motor 88 which is rotatably received in a bearing 124 mounted in flange 104. A connector designated by the numeral 140 and identical with the connector 40, is mounted on shaft 90 of motor 88. Connector 140 has a toothed upper surface 128 for a purpose to be described later. It suffices to point out at this time, that connector 140 is rotated by motor 88.

A ring 130 projecting outwardly beyond the outer peripheral edge of flange 104 is securely mounted to the latter by a plurality of bolts 132 as shown in FIG. 7 of the drawings. The lowermost peripherally extending shoulder 134 of ring 130 is beveled upwardly as the outermost periphery of ring 130 is approached. A disc 136 is interposed between disc 122 and ring 130 for the mounting of a plurality of electrical connectors 138 in the interior of connector 126 as shown best in FIGS. 4 and 5 of the drawing. Connectors 138 are adapted to be interconnected with mating components of the next adjacent module and provide means for supplying the electrical impulses and energy required for operating and controlling each module.

The input components for each module constructed pursuant to the principles of this invention are illustrated in FIG. 5 of the drawing and include a ring structure 52 mounted to the housing 50 and projecting outwardly beyond the peripheral margin of the housing to present a beveled shoulder 142 similar to shoulder 134 on ring 130 but beveled in the opposite direction. A plurality of alignment pins 144 spaced peripherally around ring 130 and mounted in flange 104 project upwardly from ring 130 in disposition to be received within corresponding holes 146 in the driven ring 142 to lock rings 52 and 130 for rotating together when adjacent modules are interconnected by connector 126. The uppermost flat surface of ring 130 matingly engages the lowermost flat surface of ring 52 when the modules are thus interconnected. Further, the upper toothed surface 128 of connector 140 matingly engages the lowermost toothed surface of a similar connector 148 comprising a component of the adjacent module. Connector 148 is secured to the shaft 58 upon which the worm 60 of the adjacent module is mounted. The electrical connectors 150 of the adjacent module fit into the corresponding connectors 138 when the modules are interconnected. To this end, it is preferred that the arrangement of the pins 144 and the holes 146 should be asymmetrical to ensure the proper positioning of the interconnected components of the respective parts when the connection is made.

A ring 152, received in housing 120 for relative rotary sliding with respect to the housing, mounts in peripherally spaced relationship around the ring a plurality of pins 154 extending through the ring and projecting from both major faces of the ring as shown in FIG. 4. A corresponding number of pairs of aligned pins 156 are also mounted in housing 120, there being a pair of pins 156 for each pin 154. The pins 156 provide the pivoting support for loops 158 at each end of an elongated, generally U-shaped spring 160 configured as illustrated in FIGS. 4 and 5 of the drawing. Each spring 160 includes a relatively large loop 162 intermediate the ends of the spring and a loop 164 extending around the medial section 166 of a spool 168. Each spool has enlarged end portions 170 and 172 with respective facing surfaces beveled away from one another as shown in the drawing. The beveled faces of each spool are configured to complementally engage the beveled shoulders 134 and 142 of the rings 130 and 52 respectively.

A plurality of spool, pin and spring assemblies are spaced peripherally around the coupler. The springs operate with their associated pins in a manner to toggle the spools generally to the positions shown in FIG. 4 when housing 120 is rotated relative to ring 152 in one direction. The spring toggle arrangement insures that the spools are moved to the positions illustrated in FIG. 6 when the housing is rotated relative to the ring in the opposite direction. The positions for the components shown in FIG. 6 are such that the beveled, enlarged ends of the respective spools are moved into engaged relationship overlapping the beveled shoulders of the rings of the driving and driven components of interconnected modules.

FIGS. 4 and 6 of the drawings reveal that ring 152 is irregularly configured along its inwardly facing edge 174 in a manner to enhance the clamping action exerted by the respective spools to lock the driving and driven members together as heretofore explained. To this end, ring 152 has a relatively deep notch 176 for each spool respectively. This notch permits retraction of the respective spools under the influence of the corresponding toggle springs to positions clearing the driving and driven members. These positions for the spools are illustrated in FIG. 4 of the drawing. An elongated, inwardly inclined ramp edge 178 proceeds from one notch 176 to the adjacent notch 176 when moving in counterclockwise direction as shown in FIG. 6. The ramp edge 178 thereby constitutes a cam for its associated spool 168 to force the spool into increasingly tight clamping engagement at the beveled rims of the interlocked rings 130 and 52 upon relative shifting movement of ring 152 with respect to the spool in a clockwise direction as viewed in FIG. 6.

In order to provide for the relative shifting of ring 152 with respect to housing 120 to operate the toggle and to cam the spools, an elongated slot 180 extending concentrically with housing 120 is provided in the housing. At least one of the pins 154 (designated 154a in the drawings) is elongated to project into slot 180. Another slot 182, concentric with slot 180 of the housing, is provided in plate 122. Pin 154a extends through both of these slots. Accordingly, the relative rotational limit of ring 152 relative to the plate or disc 122 and hence, the entire coupler is established by the length of slot 182. Similarly, the relative rotational limit of coupler housing 120 relative to ring 152 is established by the length of slot 180.

Manual rotation of the housing 120 in the direction of the arrow shown in FIG. 4 moves the spring pivot pins 156 in the same direction. This brings toggling pins 154 against the trip loops 162 causing the spool clamps 168 to be toggled in the opening direction or in a clockwise direction as viewed in FIGS. 4 and 6 of the drawings. By the same token, rotation of the housing in the direction of the arrow shown in FIG. 6 toggles the spool clamps 168 in the closing direction or in a counterclockwise direction as viewed in FIG. 6 of the drawings. After being toggled in either direction, the inherent force of each spring continues to be applied to the corresponding spool. This automatically retains the spools in position.

As indicated before, all of the couplers for interconnecting the various modules of the system are preferably of similar construction. While all couplers could be made identical for complete interchangeability of modules throughout the system, normally it will be possible to vary the sizes of certain couplers in accordance with the relative strengths of the modules of which they are a part as dictated by the load ranges expected to be handled by those modules. The couplers illustrated and described are intended to be opened or locked by manual rotation of the ring or housing 120. It is, of course, contemplated that it may be desirable for certain applications that the couplers be susceptible to mechanical operation as, for example, from remote locations such as from a control station or the like. For such applications, a suitable gear and motor attachment (not shown) may be mounted at such a coupler and operably connected with the ring 120 for turning the latter to selectively couple or uncouple the corresponding module. Such attachments for this purpose are considered to be well within the skill in this art, and need not be further shown or described in detail. Various other modifications in spring configuration, toggle arrangement and component design will suggest themselves to those skilled in the art, and may be made without departing from the spirit of the invention.

As has been heretofore pointed out, the terminal or end effector module 46 may take whatever form is required for the task intended to be accomplished by the robotic remote manipulator. FIGS. 9–12 illustrate an end effector module constructed in a manner to be particularly effective for tasks involving gripping of an item to be manipulated by the assembly. Module 46 comprises a ring 184 having a major flat face adapted to be engaged with the flat face of ring 130 of a module heretofore described. Ring 184 has a beveled shoulder 186 identical to the shoulder 142 of ring 52 heretofore described. Ring 184 is rigidly secured to a U-shaped frame element 188 which is also transversely U-shaped in cross-section. The connection for ring 184 to element 188 is through a cylindrical housing 190 having an internal bore through which extends a rotatable shaft 192 projecting upwardly through element 188 and journalled by a bearing 194 received in housing 190. A connector 196 which may be identical with connector 148 heretofore described is mounted on the lowermost end of shaft 192 for rotation with the shaft independently of the rotation of ring 184 but concentric to the latter.

Shaft 192 is threaded throughout the major portion of its length upwardly from housing 190. A U-shaped retainer 198 having a pair of spaced apart, depending, parallel legs 200 and 202 is secured to the upper end of shaft 192 by a fastener in the nature of a bearing 204 which permits relative rotation of the shaft with respect to the retainer. Each leg 200 and 202 has an inwardly directed, elongated projection 206 and 208 respectively. These projections are received in aligned slots 210 on either side of a threaded follower 212 threadably engaged on shaft 192.

Each end of element 188 pivotally mounts a corresponding jaw 214 involving parallel linkage as shown with a gripping finger or pad 216 for each jaw respectively. The parallel linkage illustrated, in association with a spring 218 for each linkage, insures that the flat surfaces 220 of the respective pads 216 remain parallel with one another throughout the range of pivoting movement of the jaws 214 with respect to the frame element 188.

As is apparent in the drawing, the legs 200 and 202 are captured between the U-shaped jaw components so that the flat outer surfaces of legs 200 and 202 hold the retainer from rotating during rotation of shaft 192 but otherwise permit the swinging of the jaws 214 about their points of pivotal attachment to the frame element. A pulley 222 is mounted on each jaw 214 in spaced relationship from the point of pivotal coupling of the jaw to the frame element. Further, a pair of pulleys 224 are rotatably mounted at fixed locations on shafts 226 extending transversely through element 188. A pair of cables 228 and 230 have respective ends secured to the follower 212 and are trained around the corresponding pulleys 224 and 222 for the respective jaws as shown in the drawings. The end of each cable opposite the end which is fixed to follower 212 is secured the the corresponding shaft 226 as shown.

It will be readily understood that the jaws may be manipulated toward or away from one another to grip or release an object upon the rotation of connector 196 to move follower 212 linearly along shaft 192 as a result of the threaded relationship between the shaft and the follower. The follower is prevented from rotation by the projections of the retainer extending into the follower slots. Obviously, the movement of the follower in the direction to pull on cables 228 and 230 swing the jaws about their respective pivot points to bring the facing surfaces 220 of the pads 216 together. Conversely, rotation of shaft 196 in a direction to release the tension on the cables 228 and 230 permit the opening of the jaws under the influence of the respective springs 218 attached to each jaw.

The operation of a modular robotic manipulator as described will be generally apparent from the description which has been given for the various components. The controls for the various motors to effect articulation of the components of the system form no part of the invention per se and are not shown or described in detail. It suffices to say that such controls are conventionally available and in widespread use in manipulators of this general type. Such controls involve motion sensor means sensing the positional relationship of the various components and motor driving means are employed whereby the components can be moved to any particular position within the ranges of movement afforded by the component construction through a predetermined series of incremental movements or steps. The motors generally receive electrical impulses corresponding to the movement desired. Through receipt of such commands, the motors are energized to carry out the movements resulting in corresponding movements of the manipulator components. Such electrical impulse commands and sensings, as well as the electrical energy for activating the motors, are transmitted through the modules of the manipulator by the multi-pronged electrical connections effected by the connectors 138 and 150 when the modules are interconnected as has been described. Manifestly, the electrical connectors are interconnected by suitable wiring to effect this result.

It will be apparent to those skilled in the art that the motors for operating the modules of this invention need not necessarily be electric. For example, pneumatic or hydraulic motors could be used with the corresponding use of supply lines associated with suitable controls to effect the required articulation of the module components.

Each of the articulating modules, such as module 32 described in substantial detail, provides a plurality of individually available motions to be imparted to the next adjacent module. These include the rotary movement afforded by rotation of the coupling attaching the module to the preceding module. This rotation is powered by a motor on the preceding module operably connected with the coupling. The connector 40 from a preceding module extends through the coupling and provides a concentric, but independent rotation for a shaft which causes pivoting of the upper section of a given module with respect to its base. This pivoting is about the axis of the module shaft 76 as heretofore described.

Additionally, each module carries a motor 110 which rotates its respective output coupling in similar fashion to the rotation of the output coupling of the preceding module. This rotation of the module's output coupling is along an axis which intersects but need not be aligned with the axis of rotation of the input coupling.

Another motor contained within the module drives the connector for operating the worm gear of the next succeeding module or for operating an end effector as described. The torque provided by this motor is applied along an axis which is concentric with but independent of the rotation of the output coupler of the module.

It will thus be understood that the construction of articulating modules embodying the principles of this invention are capable of providing independent movement of the output coupler of each module about three separate axes of rotation. Further, these axes of rotation intersect at a common point located intermediate the input and output ends of the module itself. Each module is capable of providing movement of the output end of the module through substantially all points located on an imaginary sphere defined by the range of available movement at the module output end. This materially enhances the capability of the overall manipulator to effect substantially any desired motion for accomplishing whatever tasks may be assigned to the assembly.

The novel coupler of this invention permits ready and reliable interconnecting of assembly modules in a manner to transmit whatever forces may be necessary from one module to another and to transmit operational torque or movement to other modules down the line. Further, the couplers are designed in a manner for quick and reliable connection and equally ready release to effect savings of time for incorporating modules into the system or removal of modules from the assembly as may be desirable to effect the ideal makeup of the manipulator for any task assigned.

The arrangement of pulleys and cables operated by a follower on a threaded shaft presents a utility of operation for the end effector available as a result of the novel transmission of torque through the modular connecting system along the connector axis of rotation but independent of movement of the connector. This construction obviates the requirement for a separate operating motor and control at the end effector as is conventional. The elimination of the motor at the end effector permits the latter to be moved with greater dexterity than has heretofore been generally possible. The threaded shaft and follower operation of the end effector permits highly selective application of whatever torque may be required for the gripping action appropriately suited for objects to be handled with the system. This sensitivity affords accommodation of highly fragile items which must be gripped with vary slight force as well as extremely heavy items which require substantial gripping forces.

Having thus described the invention, I claim:

1. A module for a remote manipulator and having a driven input end and a driving output end spaced from the input end, said module comprising:

structure at the input end adapted to be operably coupled in driven relationship with said manipulator for rotating said structure about a first axis;

a component pivotally carried by said structure for pivoting movement about a second axis intersecting with said first axis, said component being adapted to be operably coupled with said manipulator for pivoting the component;

an ouptut element rotatably carried by the component for movement therewith and for rotation about a third axis, said element extending to the module output end;

motor means carried by the module and operably coupled with the element for rotating the latter;

said first, second and third axes all intersecting between the module input and output ends whereby to maximize the range of movement of the element which may be effected at the module output end within the spacing afforded between said module ends; and a second motor means secured to the element for rotation therewith, the output shaft of said second motor means being rotatable on said third axis to provide a rotary drive at the module output end concentric with but independently rotatable with respect to the rotation of said element, said rotary drive being adapted for coupling with another module for rotating the latter.

2. A module as set forth in claim 1, wherein the axis of pivoting movement of the component extends perpendicularly to the axis of rotation of said structure.

3. A module as set forth in claim 1, wherein said first, second and third axes all intersect at a common point.

4. A module as set forth in claim 1, wherein said rotary drive and said element rotate on a common axis, and wherein said common axis intersects said first and second axes of rotation at a common point.

5. Apparatus for interconnecting two adjacent structures for movement together as a unit, said apparatus including:

a pair of annular members having mutually abutting peripheral margins, each member being secured to a corresponding one of said structures, each member having a shoulder on the edge thereof remote from the other member, said shoulder extending radially inwardly from the outer periphery of the member, the shoulders of each member being beveled to incline in the direction of the other member as the outer margins of the members are approached;

a plurality of locking spools disposed in spaced apart relationship around the periphery of the members, each spool having a pair of spaced apart, enlarged annular ends interconnected by a section of reduced cross-sectional diameter to present generally U-shaped recesses between the enlarged spool ends, the inner surfaces of the spools being provided with bevels complemental to the bevels of the members and disposed to engage the shoulders of the members for locking the members together when the spools are moved to positions with the outer margins of the members extending into the recesses of the spools; and means operably coupled with said spools for moving the latter as a unit into and away from said member locking positions to permit selective intercoupling and separation of said structures.

6. Apparatus as set forth in claim 5, wherein said spool moving means includes an annular housing, a ring received in the housing for limited relative rotation with respect to the housing, toggle means mounting the spools to the ring, and means operably coupled with the toggle means and with the housing for operating the toggle means to move the spools into and out of their clamping positions as a unit responsive to relative rotation of the housing and the ring.

7. Apparatus as set forth in claim 6, wherein said ring includes a cam surface for each spool respectively, each cam surface being disposed to engage its corresponding spool to prevent the latter from moving away from locking engagement with the structures when the housing is rotated beyond the limits of said limited relative rotation with respect to the ring resulting in rotation of the ring with respect to said spools.

* * * * *